United States Patent Office 3,162,677
Patented Dec. 22, 1964

3,162,677
PURIFICATION OF GLYCOL ESTERS
Lee H. Horsley and David P. Sheetz, Midland, Mich., assignors to The Dow Chemical Company, Midland, Mich., a corporation of Delaware
No Drawing. Filed June 20, 1962, Ser. No. 203,715
4 Claims. (Cl. 260—486)

This invention is concerned with the purification of glycol esters of unsaturated acids and it is particularly concerned with the separation and purification of lower alkylene glycol monoesters of acrylic and substituted acrylic acids which normally contain small amounts of the corresponding diesters.

These glycol monoesters are represented by the formula $$C_nH_{2n-1}CO_2C_xH_{2x}OH$$

wherein $n$ and $x$ are integers from 2 to 4. They comprise the monoesters of ethylene glycol, propylene glycol, trimethylene glycol, butylene glycol, 1,3-butanediol, and the like with acrylic acid, methacrylic acid, and ethacrylic acid. These esters are valuable monomers for polymerization. The resulting polymers are of particular interest in that they have free hydroxyalkyl groups in their structure which not only impart distinctive properties, but also serve as reactive sites for further modification. In the preparation of monoesters such as described, conveniently by the reaction of an alkylene oxide with the acrylic acid of choice, small amounts of the corresponding diesters are formed concurrently. These impurities are highly undesirable in that they are doubly unsaturated molecules which even in minute proportions cause the formation of cross-linked gels when the esters are polymerized.

A conventional process for the removal of such impurities is fractional distillation. This method is, however, particularly disadvantageous in the present case. For example, the monoester and the corresponding diester usually have similar boiling points and efficient fractionation is required to separate them. Even with very careful fractionation, the essentially complete removal of diester which is necessary in this case is difficult to attain. Additionally, these esters are readily polymerized by heat and although polymerization in the distillation pot can be controlled with inhibitors, the formation of polymeric material in the column and distillation head is not easily avoided. The polymers thus formed are highly crosslinked and insoluble and their removal from process equipment is difficult and requires mechanical cleaning or burning out.

It has now been found that glycol monoacrylates of the class described are effectively separated from small quantities of the corresponding diesters and can be obtained in high yield and in high purity by an extraction process which comprises intimately contacting an aqueous solution of the crude monoester with a water-immiscible organic solvent of a class as defined below, thereby extracting from the monoester at least a substantial portion of the contaminating diester, and separating the thereby purified aqueous monoester solution. The operable solvents are those having three particular characteristics which, when taken together, specifically define the class. The first of these is a low dielectric constant ($e$), that is, a value less than 10 and preferably from 1.8 to 5.0, these values being measured at 20° C. using audio frequencies, i.e., from 20 to 20,000 cycles per second. A second physical constant further delimiting the class of operable solvents is the solubility parameter. This constant is derived from the heat of vaporization as explained by Hildebrand and Scott in Solubility of Nonelectrolytes, 3rd edition, 1950, pp. 435–9. It has been found that the solvents operable in this extraction process are those as otherwise defined whose solubility parameter $\delta$ satisfies the equation $$\delta = A - \frac{x+n}{2}$$

wherein $x$ and $n$ are integers from 2 to 4 as previously defined and A is a number from 10 to 11.5. The $\delta$ values referred to in this specification are those determined at 25° C. As can be seen by the above equation, $\delta$ varies inversely as the molecular weight of the monoester being extracted. The third defining characteristic of the operable solvents is their structure. They are normally liquid aromatic, aliphatic, and cycloaliphatic hydrocarbons, their normally liquid chlorinated derivatives, and mixtures thereof, having the other distinguishing features as described above.

The solvents thus characterized are broadly operable in the process, but the most efficient extractants for a particular crude ester are determined by their combined solubility, density, and similar characteristics. Solvents found to be highly effective in specific applications of the process include toluene, hexane, heptane, octane, cyclohexane, cyclohexene, ethylcyclohexane, and carbon tetrachloride. Related solvents such as benzene, xylene, chlorobenzene, chloroform, ethylene dichloride, and perchloroethylene are also suitable, ordinarily as components of solvent mixtures having the characterizing properties described above. Such mixtures are often preferred extractants in that their solubility, density, and similar characteristics can be tailored to fit a particular problem and better results can be obtained thereby than would be possible with any single compound. For example, a solvent which dissolves too much of the monoester along with the diester may be diluted with a solvent having low solvent power to obtain a solvent mixture having the desired properties. In this way, solvents having too high or too low dielectric constants or solubility parameters may be utilized as components of highly advantageous mixtures which have such values in the ranges specified. Such solvents which have been applied effectively in the process include mixtures of hexane with cyclohexane, heptane with chlorobenzene, cyclohexane with carbon tetrachloride, benzene with heptane, and heptane with methylene chloride.

Under preferred operating conditions, virtually all of the diester impurity can be removed without significant loss of monoester. The process requires only conventional equipment and it is preferably carried out at ambient temperature and at essentially atmospheric pressure.

The extraction process is applied not to the crude ester alone but to an aqueous solution of the ester. Preferably such a solution is made up to contain about 25% to about 75% by volume of crude ester. Solutions containing about 40–60% of ester are usually most convenient. The remainder of the solution is made up either of water or of water containing sufficient lower aliphatic alcohol to dissolve the particular ester, where that ester has limited solubility in water. Preferably, the lower aliphatic alcohol is an alkylene glycol, usually the glycol corresponding to the ester being purified. The term "aqueous solution" is used herein and in the appended claims, therefore, to include not only solutions consisting of ester and water, but also aqueous solutions of partially water-soluble esters which additionally contain a solubilizing amount of an alcohol as defined above. When the extraction process is applied to a solution containing more than about 75% ester, selectivity of the extraction is impractically low. Lower ester concentrations increase extraction selectivity, but concentrations greater than about 25% are usually desirable for recovery of the purified product. The purified monoester may be separated from its water solution by distillation or by solvent extraction, using a water-immiscible relatively polar solvent such as methylene chloride.

The process is most conveniently operated at or near room temperature, for example, at 15–35° C. and at atmospheric or substantially atmospheric pressure. Temperatures of 0–100° C. and any pressure above the vapor pressure of the solvent may be employed.

The ratio of solvent to ester is not critical and is preferably the minimum necessary to effect the desired degree of separation. Larger quantities of solvent result in small but increased losses of monoester. Ordinarily about 0.5 to about 2 volumes of solvent are used per volume of ester where there is present up to about 5% of diester impurity. The exact ratio to be used will vary according to the efficiency of the particular solvent, the amount of diester to be extracted, and the efficiency of the extraction equipment being used.

The extraction process may be run as a batchwise operation, as a multi-stage process, or as a continuous countercurrent extraction in a column of conventional design. For large scale operation, the latter is usually preferred.

The following examples illustrate various ways in which the invention has been applied. The characteristics of the polymer obtained by polymerization of the extracted monoester provide a fairly accurate indication of the proportion of diester remaining in the product. Thus, a monoester substantially free of diester yields an alcohol-soluble polymer while polymers described as stringy, rubbery but partially soluble in alcohol, or alcohol-insoluble indicate respectively that most, some, or little or none of the diester content had been removed. This technique has been found to be a sensitive test for very small amounts of diester, the presence of as little as 0.1% of diester being clearly indicated by the formation of a largely alcohol-soluble but stringy polymer.

EXAMPLE 1

A kilogram of technical 2-hydroxyethyl methacrylate containing 1–2% of ethylene dimethacrylate was dissolved in an equal weight of water and this solution was extracted four times with 250 ml. portions of a solvent consisting of four parts by volume of cyclohexane to one part of carbon tetrachloride. The resulting aqueous raffinate was placed under vacuum at room temperature to remove the last trace of dissolved organic solvent, after which step the aqueous solution weighed 1985 g. A 10 ml. sample of this aqueous ester was mixed with 5 ml. ethyl alcohol, 0.5 ml. of 2% aqueous thiourea, and 0.2 ml. 35% hydrogen peroxide and allowed to polymerize. The polymer thereby obtained was a viscous alcohol-soluble liquid, indicating essentially complete removal of diester.

Similar polymerization of a sample of the aqueous ester which had not been extracted yielded an alcohol-insoluble gel.

These results and those obtained from smaller scale extractions of this same crude ester with other solvents by the procedure described above are listed in Table 1.

*Table 1*

| Solvent | $e$ | $\delta$ | Polymerized Raffinate |
|---|---|---|---|
| None (blank) | | | Rubbery, alcohol-insoluble. |
| 80% cyclohexane 20% benzene | 2.10 | 8.4 | Viscous, alcohol soluble. |
| 80% cyclohexane 20% CCl₄ | 2.09 | 8.3 | Do. |
| Cyclohexane | 2.05 | 8.2 | Stringy, partially alcohol-soluble. |
| 66% heptane 34% benezene | 20.3 | 8.0 | Do. |

According to the equation previously shown for solubility parameter, suitable solvents for purifying this monoester are those having a $\delta$ value of 7.5–9.0. The above data indicate that the most efficient solvents are those having values of about 8.3–8.4.

EXAMPLE 2

An extraction column was prepared by packing a glass tube one-half inch in diameter and 44 inches in length with small glass helices. The packed column was filled with a 50% by weight aqueous solution of 2-hydroxyethyl acrylate containing 1–2% of diester and countercurrent extraction of the aqueous ester was run continuously by feeding in the aqueous solution at the top of the column while toluene was added continuously at the bottom. The toluene solvent overflowed at the top while the aqueous raffinate was removed at the bottom of the column, the feed rates being maintained in such relationship as to maintain the liquid-liquid interface near the middle of the column. The actual rates employed were 173 g./hr. of aqueous ester and 143 g./hr. of toluene. At the start, the raffinate was recycled to obtain equilibrium conditions. Total amounts of 788 g. of toluene and 954 g. of aqueous ester were used in the experiment, 835 g. of extract and 871 g. of aqueous raffinate being recovered. A sample of the raffinate was polymerized as in Example 1 to give an alcohol-soluble viscous liquid. Polymerization of the original ester produced an insoluble gel.

By the procedure described in Example 1, small scale trial extractions of the above crude ester solution were run using various solvents. Results are listed in Table 2.

*Table 2*

| Solvent | $e$ | $\delta$ | Polymerized Raffinate |
|---|---|---|---|
| None (blank) | | | Alcohol-insoluble gel. |
| Toluen | 2.39 | 8.9 | Viscous, alcohol-soluble. |
| 30% heptane 70% benzene | 2.19 | 8.6 | Do. |
| 50% heptane 50% benezene | 2.12 | 8.3 | Partially alcohol-soluble. |

Solvents having relatively high solubility parameters, i.e., from 8.5–9.0 were found to be most effective in this case as predicted by the formula.

EXAMPLE 3

A 300 g. sample of 50% aqueous 2-hydroxypropyl acrylate containing about 2% of the diester was extracted six times with 80 ml. portions of a solvent consisting of four parts by volume of cyclohexane to one part of carbon tetrachloride. The final raffinate weighed 286 g. and when polymerized, it formed a viscous, alcohol-soluble polymer, indicating that essentially all of the diester had been removed. This and results obtained by extracting the crude solution with similar solvents are shown in Table 3.

*Table 3*

| Solvent | $e$ | $\delta$ | Polymerized Raffinate |
|---|---|---|---|
| None (blank) | | | Rubbery, alcohol-insoluble. |
| 20% chlorobenzene 80% cyclohexane | 2.83 | 8.5 | Viscous, alcohol-soluble. |
| 20% CCl₄ 80% cyclohexane | 2.09 | 8.3 | Do. |
| 30% chlorobenzene 70% heptane | 3.12 | 8.0 | Do. |

EXAMPLE 4

Because 2-hydroxypropyl methacrylate is only partially soluble in water, a 50% by volume solution of this ester in 50% aqueous propylene glycol was prepared. Samples (10 ml.) of this solution were extracted four times with 2 ml. portions of several solvents. Results are tabulated in Table 4.

Table 4

| Solvent | e | δ | Polymerized Raffinate |
|---|---|---|---|
| None (blank) | | | Rubbery, alcohol-insoluble. |
| Hexane | 1.87 | 7.3 | Viscous, alcohol-soluble. |
| Heptane | 1.97 | 7.4 | Sl. stringy, alcohol-soluble. |
| Cyclohexane | 2.05 | 8.2 | Viscous, alcohol-soluble. |

EXAMPLE 5

Using the procedure of Example 4, samples of crude 2-hydroxybutyl acrylate in aqueous propylene glycol solution were extracted with some hydrocarbon solvents.

Table 5

| Solvent | e | δ | Polymerized Raffinate |
|---|---|---|---|
| None | | | Stringy, partially insoluble. |
| Cyclohexane | 2.05 | 8.2 | Alcohol-soluble. |
| Octane | 1.96 | 7.5 | Do. |
| Hexane | 1.87 | 7.3 | Do. |

We claim:
1. A process for purifying a glycol monoester having the formula

$$C_nH_{2n-1}CO_2C_xH_{2x}OH$$

wherein $n$ and $x$ are integers from 2 to 4 and containing as an impurity a small amount of the corresponding glycol diester, which process comprises intimately contacting said monoester in aqueous solution with an organic solvent characterized by
  (1) a dielectric constant of 1.8–5,
  (2) a solubility parameter δ at 25° C. which satisfies the formula $$\delta = A - \frac{x+n}{2}$$

wherein $x$ and $n$ are as defined above and A is a number from 10 to 11.5,
  (3) being selected from the group consisting of normally liquid aliphatic, cycloaliphatic, and aromatic hydrocarbons, their normally liquid chlorinated derivatives, and mixtures thereof,
thereby extracting from said monoester at least a substantial portion of the diester impurity, and separating the thereby purified aqueous monoester solution.

2. The process of claim 1 wherein the aqueous monoester solution contains 25–75% by volume of monoester.

3. The process of claim 1 when carried out as a continuous process wherein the aqueous solution of glycol monoester containing a small amount of the corresponding diester as an impurity is introduced near one end of a liquid-liquid countercurrent extraction system, the organic solvent is introduced near the other end of the system into extractive contact with the aqueous solution therein, withdrawing from said one end an organic solvent extract containing glycol diester, and withdrawing from said other end an aqueous glycol monoester raffinate substantially free of diester.

4. The process of claim 1 wherein the aqueous monoester solution additionally contains a solubilizing amount of a lower alkylene glycol.

No references cited.